Patented Jan. 26, 1926.

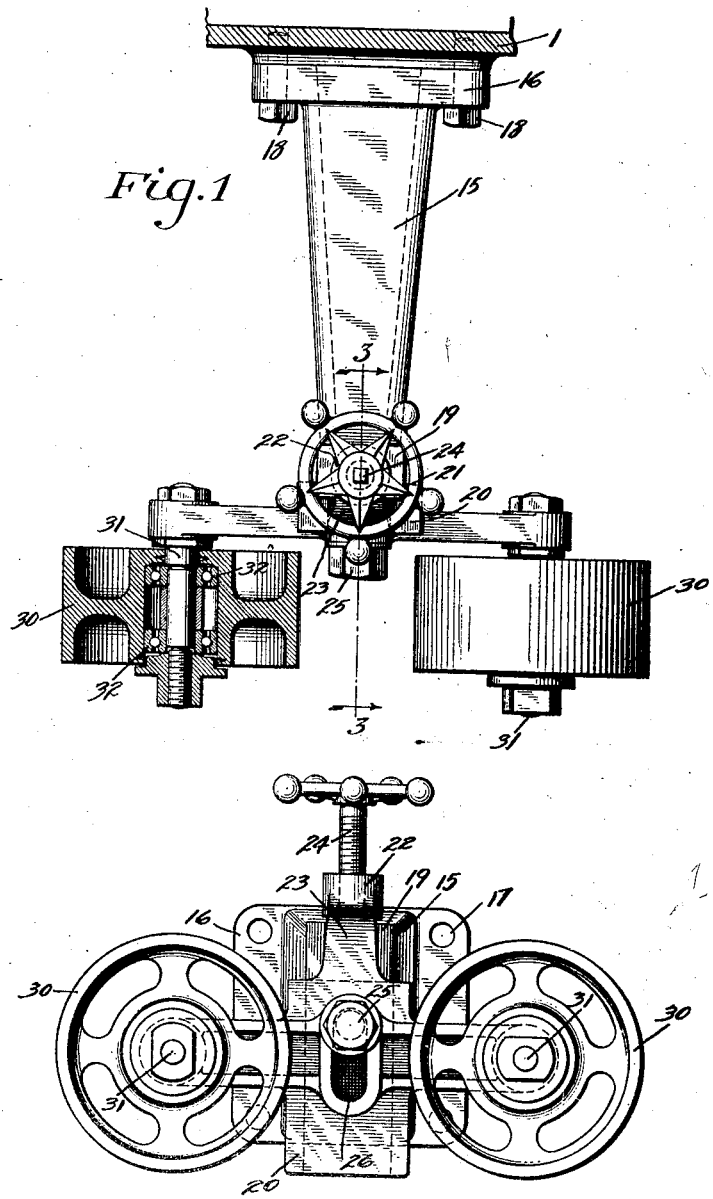

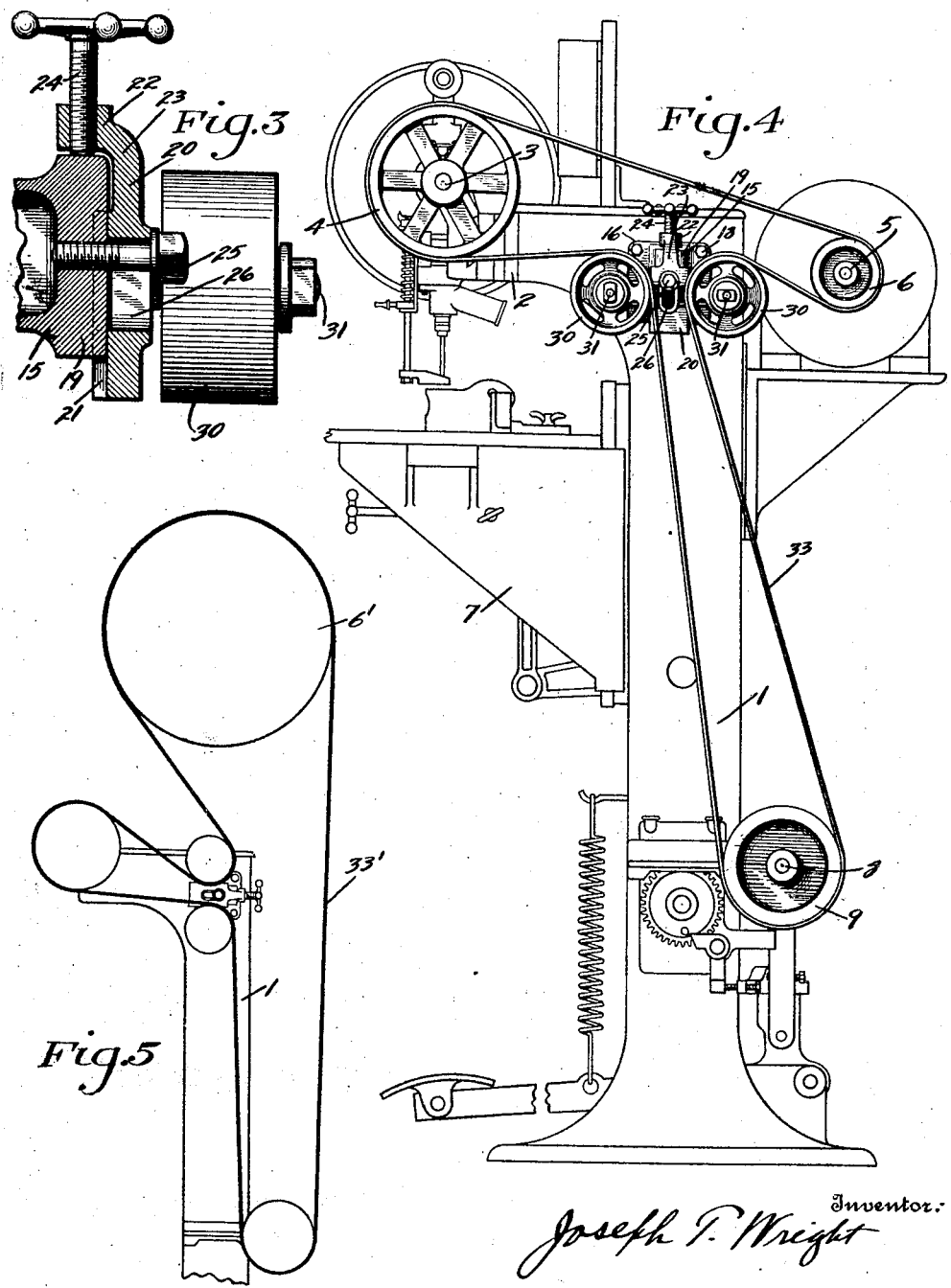

1,571,153

UNITED STATES PATENT OFFICE.

JOSEPH T. WRIGHT, OF CINCINNATI, OHIO, ASSIGNOR TO THE J. T. WRIGHT COMPANY, OF CINCINNATI, OHIO, A CORPORATION OF OHIO.

PULLEY DRIVE AND BELT TIGHTENER.

Application filed July 21, 1922. Serial No. 576,591.

*To all whom it may concern:*

Be it known that I, JOSEPH T. WRIGHT, a citizen of the United States, and residing at Cincinnati, in the county of Hamilton and State of Ohio, have invented a new and useful Improvement in Pulley Drives and Belt Tighteners, of which the following specification is a full disclosure.

This invention relates to belt tighteners and has among its objects the provision of a device for effectively tightening a belt disposed to transmit power from a driving pulley to a plurality of driven pulleys.

Another object is to increase the arc of contact between the belt and pulleys, which object is accomplished by providing a novel form of tightening device and positioning the same in a novel manner relative to driving and driven pulleys.

Another object is to provide for the angular adjustment of the tightener whereby the same may be angularly adjusted conformably to the various drive requirements.

The invention finds particular utility as applied to a type of paper drilling machine described in Patent No. 1,347,214, to Alexander Dom, July 20th, 1920, in which two driven pulleys are disposed at relatively different heights and in vertical disalignment, each being driven from two driving pulleys mounted on the same driving shaft, each driving pulley connected by a separate belt with its driven pulley, and in which it is desirable to maintain the rate of spindle rotation and the feed traverse of the table in synchronism.

In this invention, two driven pulleys are connected with the driving pulley by a single belt, and my improved belt tightening device is so disposed in relation to the pulleys that the arc of contact of the belt with all pulleys is materially increased, and to have the arc of belt contact prevail on the driven pulleys over the driving pulley so that any belt slippage will be about the driving pulley in preference to the driven pulleys.

The tightening device finds application wherever it is desirable to tighten a belt disposed to operate two driven pulleys from a single driving pulley either when the driving pulley is at one side of the driven pulleys or when the driving pulley is located in a plane above both pulleys.

Additional objects and certain advantages will be disclosed in the description of the drawings forming a part of this application, in which:

Figure 1 is a plan view of the belt tightener, one of the idler pulleys or wheels being shown in section.

Figure 2 is a front end view of the belt tightener.

Figure 3 is a central section on line 3—3, Figure 1.

Figure 4 is a side elevation showing the belt tightener applied wherein the driving pulley is at the side of the driven pulleys.

Figure 5 is a diagrammatic view showing the belt tightener adjusted and adapted for tightening a belt driven from an overhead pulley.

The machine comprises a main frame 1, having a broadened supporting base. Upon the frame is attached a projecting head bracket 2 upon which are mounted drill spindles adapted to be driven by the shaft 3, said shaft having a pulley 4 thereon. Suitable driving means, such as a motor, is provided, the motor shaft 5 having a single pulley 6 thereon and said motor being mounted upon a support at the rear of the frame 1. A reciprocable work table 7, upon which the stock to be drilled is placed, is mounted upon slides at the front of the frame and is adapted to move toward and away from the drill spindles. The table is reciprocably operated by means of a mechanism adjacent the lower end of the frame, which mechanism is in driving connection with a shaft 8 having a pulley 9 thereon.

The shaft 3, which operates the drill spindles, the speed of rotation of which shaft controls the rate of spindle rotation, and the shaft 8, which controls the rate of travel of the work table toward and away from the spindles, are designed to operate in synchronism and it is desirable for the successful operation of the machine that the synchronism be maintained. To this end, a novel form of belt tightener is provided and positioned relative to the driven and driving pulleys, in such manner that the combined arcs of contact of the belt with the driven pulleys is greater than the arc of contact of said belt with the driving pulley. Should slippage take place it will do so upon the driving pulley only and therefore the relative speed ratios between the driven pulleys will remain unchanged.

As shown in Figure 4, when a motor is used as driving means, and is mounted as illustrated, my improved belt tightener is preferably arranged substantially between pulleys 4 and 6. The tightener comprises a pedestal or base 15 having an attaching flange 16 provided with bolt openings 17 through which suitable bolts 18 pass to attach the pedestal to the frame 1. The outer end of the pedestal is provided with a rectangular head 19 having a plane face at a right angle to the long axis of the pedestal which plane face normally lies in a vertical plane. Adapted to slide upon the head 19 is a cross-arm or support 20, providing a centrally disposed guide-groove 21 designed to engage the head and to lie slidingly against the plane face thereof. An inturned lug 22 projects from an arm 23 of the support, which arm is disposed centrally of the same. The lug is threaded for engagement by an adjusting screw 24 designed to traverse the lug and abut the upper face of the head to form a means of micrometrically and forcibly sliding the support upon the head. The support is held against the plane face of the head 19 by a headed screw 25, the screw traversing an elongated slot 26 in the support, the head thereof adapted to bridge the slot and engage the front face of said support to prevent its detachment, and allow it to slide.

Disposed symmetrically at each side of the center of the support and at the extremities thereof, are idler pulleys or wheels 30 mounted upon suitable stub shafts 31 projecting at a right angle thereto, ball bearings 32 being provided.

The structure of my tightener permits of vertical adjustment of the same when disposed as shown in Figure 4, and a horizontal adjustment when the pedestal has been rotated to an angle of 90° as shown in Figure 5.

In Figure 4, the belt 33 is passed around the pulley 6, over one of the idler pulleys 30, around the pulley 9, between and around the other pulley 20 and around the pulley 3 as shown. When thus arranged, the screw 23 may be operated to translate the support 20 in vertical direction to tighten the belt.

As shown in Figure 5, the driving pulley 6' is disposed above the machine and the pedestal of the tightener having been rotated to the right through an arc of 90° disposing the idler wheels in vertical alignment, in which position of the tightener the wheels may be translated in horizontal direction to tighten the belt 33'. In this position the support is moved to the right to tighten the belt.

In both positions of the tightener the arc of contact of the belt with the pulleys is substantially increased.

Having described my invention, I claim:

1. In a machine of the character disclosed, a machine frame, a driven pulley journaled upon said frame at a low elevation for transmitting motion to a movable element slidable upon said frame, a second driven pulley journaled upon said frame at a high elevation for transmitting motion to a rotatable element as journalled upon said frame, a driving pulley, a single belt engaged about said driving and driven pulleys for uni-directional rotation of all pulleys, and a pair of idler pulleys unitarily supported intermediate of said driving and driven pulleys for engaging said belt at positions obtaining a maximum arc of belt contact with said driving and driven pulleys and adjustable for belt tightening control.

2. In a machine of the character disclosed, a machine frame, a driven pulley journaled upon said frame for transmitting motion to a movable element slidable upon said frame, a second driven pulley journaled upon said frame at a different elevation from said first driven pulley for transmitting motion to a rotatable element as journaled upon said frame, a driving pulley, a single belt engaged about said driving and driven pulleys, a pair of idler pulleys unitarily supported intermediate of said driving and driven pulleys for engaging said belt to provide a maximum arc of belt contact with said driving and driven pulleys, a movable support for journalling said idler pulleys, and means for adjusting said supports to unitarily adjust said idler pulleys for belt tightening control.

In witness whereof, I hereunto subscribe my name.

JOSEPH T. WRIGHT.